(No Model.)
A. M. TUCKER & C. W. SMITH.
BUNDLE TIE.
No. 418,994. Patented Jan. 7, 1890.
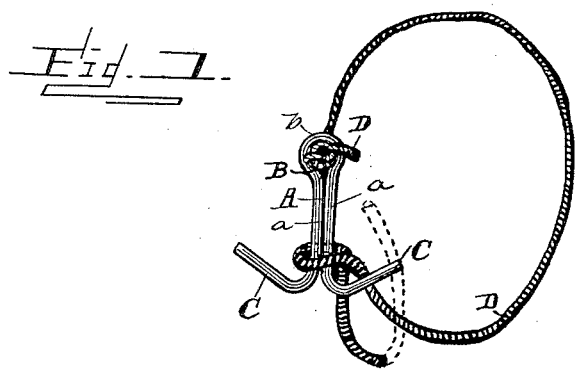
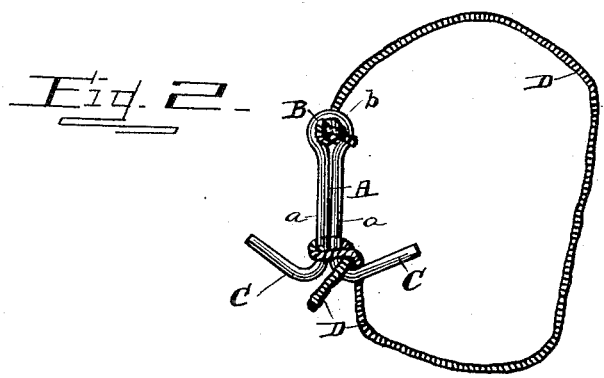
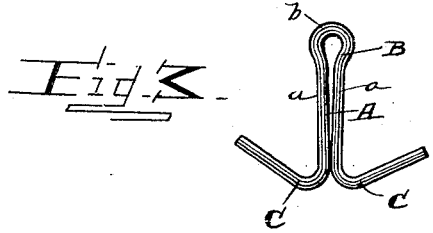
Witnesses
A. E. Sowell
C. W. Seville
Inventors
A. M. Tucker and C. W. Smith
By their Attorney J. A. Alexander

UNITED STATES PATENT OFFICE.

ARTHUR M. TUCKER AND CHARLES W. SMITH, OF KINSEY, OHIO.

BUNDLE-TIE.

SPECIFICATION forming part of Letters Patent No. 418,994, dated January 7, 1890.

Application filed June 22, 1889. Serial No. 315,292. (No model.)

*To all whom it may concern:*

Be it known that we, ARTHUR M. TUCKER and CHARLES W. SMITH, citizens of the United States, residing at Kinsey, in the county of Montgomery and State of Ohio, have invented a new and useful Bundle-Tie, for tying fodder, fruit-trees, kindling, laths, pickets, and bundles of all kinds, of which the following is a specification.

This invention is an improvement in bundle-ties; and its object is to provide a simple device by which the binding cord or twine can be readily secured or fastened around the shock or bundle; and it consists in a peculiarly shaped wire or metal loop constructed as hereinafter described and shown in the drawings, to which reference is had by figures and letters. The tie is roughly anchor-shaped, as shown, and is formed of a single piece of wire, which is bent centrally and sharply upon itself, as at $b$, forming an eye B. From this bend the portions $a$ $a$ of the wire extend parallel and very close to or abutting against each other for a length about equal to three lengths of eye B, forming a double wire or compound shank A, and at the extremity of this shank the portions $a$ $a$ are bent outwardly at right angles to each other, and terminate in the opposite upwardly and outwardly inclined straight hooks or arms C C, as shown. The eye, shank, and arms of the tie all lie in the same plane, so that if the tie is looked at edgewise it is but the thickness of the single wire from which it is formed.

In practical use a piece of twine D of the proper length is knotted at one end, and this knotted end slipped up into eye B, as indicated. The free end of the twine is then passed around the bundle and over one hook C, then drawn outwardly over said hook, binding the tie against the shock and bundle, the cord being drawn taut. While thus tightened the free end of the twine is slipped over the other hook and drawn downward and backward beneath the first hook, and between the same and the portion of the cord caught thereon, as indicated in Figs. 1 and 2; or, in other words, knot one end of the twine and slip it between the hooks and pull it up between the portions $a$ $a$ of the shank, so that the knot holds in the eye, then bring the twine around the bundle and over both hooks, and draw it as tight as desired, and then pull the free end of the twine up between the first hook and the twine, when it will be tied, as shown in the above cut.

The advantages of this tie are that it saves cord—which can be tied from a ball—it takes but one loop to make the tie, and the loop prevents spreading of the arms when the cord is secured, and secures the knotted end of the cord by preventing its being drawn out between the portions $a$ $a$ of the shank.

We are aware that various forms of wire ties have been used; but in these the members of the shank have been bowed apart between the eye and hooks, or a large loop has been used, no shank being formed therewith. The shank of our tie, formed as described, is important, in that it makes the tie rigid, or prevents lengthening of the tie, whereas where loops or bowed ties are used the tie yields under strain, the bowed portions of the wire yielding, or else there is danger of the knotted cord being knocked down toward the hooks out of the loop or eye and escaping; whereas in our tie, after the knot is slipped into the eye and the cord tied, as described, even though the knotted end of the cord be pulled down out of the eye, it will be held fast in the shank and cannot be forced out of the tie unless the other end of the cord is unfastened from the hooks.

Having described our invention, what we claim as new, and desire to secure by Letters Patent thereon, is—

As an improved article of manufacture, the herein-described wire device for use with cords in tying bundles, &c., the same consisting of a single length of wire bent centrally upon itself into a small eye B, its opposite portions $a$ $a$ then extending from said eye parallel with and close to each other to form a double wire shank A of suitable length, the said portions $a$ $a$ being bent outwardly at the end of said shank in opposite directions, and extending in straight upwardly and outwardly inclined arms C C, the parts lying in the same plane when viewed edgewise, all substantially as described.

ARTHUR M. TUCKER.
CHARLES W. SMITH.

Witnesses:
ANTON F. WENDELN,
ALBERT KERN.